United States Patent
Choi et al.

(10) Patent No.: US 12,157,446 B2
(45) Date of Patent: Dec. 3, 2024

(54) ELECTRONIC PARKING BRAKE SYSTEM AND METHOD OF CONTROLLING THE SAME

(71) Applicant: HL MANDO CORPORATION, Pyeongtaek-si (KR)

(72) Inventors: Junyeol Choi, Seongnam-si (KR); Yongkil Kim, Seoul (KR); Seongho Choi, Anyang-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 86 days.

(21) Appl. No.: 17/862,907

(22) Filed: Jul. 12, 2022

(65) Prior Publication Data
US 2023/0039115 A1  Feb. 9, 2023

(30) Foreign Application Priority Data
Aug. 6, 2021 (KR) .......................... 10-2021-0103706

(51) Int. Cl.
*B60T 13/74* (2006.01)
*B60T 7/08* (2006.01)
*B60T 7/12* (2006.01)
*F16H 63/34* (2006.01)
*F16H 63/48* (2006.01)

(52) U.S. Cl.
CPC .............. *B60T 13/74* (2013.01); *B60T 7/085* (2013.01); *B60T 7/12* (2013.01); *F16H 63/3491* (2013.01); *F16H 63/483* (2013.01)

(58) Field of Classification Search
CPC . B60T 7/12; B60T 7/085; B60T 13/74; B60T 13/741; F16H 63/3458; F16H 63/3466; F16H 63/3491; F16H 63/483; F16H 2061/223
See application file for complete search history.

(56) References Cited

U.S. PATENT DOCUMENTS

| | | | | |
|---|---|---|---|---|
| 8,862,284 B2* | 10/2014 | You | .......................... | B60R 25/00 |
| | | | | 701/2 |
| 2021/0155207 A1* | 5/2021 | Uehara | .................... | B60T 17/22 |

FOREIGN PATENT DOCUMENTS

| KR | 10-2012-0035262 A | 4/2012 |
|---|---|---|
| KR | 10-2020-0072998 A | 6/2020 |

* cited by examiner

*Primary Examiner* — Timothy Hannon
(74) *Attorney, Agent, or Firm* — LEE, HONG, DEGERMAN, KANG & WAIMEY (57) ABSTRACT

Provided is an electronic parking brake system including: an electronic parking brake provided in at least one of a front wheel and a rear wheel of a vehicle and driven by a motor; and a controller electrically connected to the motor, wherein the controller is configured to determine whether a gear stage of an electronic transmission system (a shift by wire: SBW) is shifted to a neutral position during ignition-off of the vehicle, and upon determining that the gear stage is shifted to the neutral position, release engagement of the electronic parking brake.

14 Claims, 6 Drawing Sheets

ELECTRONIC PARKING BRAKE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2021-0103706, filed on Aug. 6, 2021 in the Korean Intellectual Property Office, the disclosure of which is incorporated herein by reference.

BACKGROUND

1. Field

The present disclosure relates to an electronic parking brake system and a method of controlling the same.

2. Description of the Related Art

In general, when a parking lot does not have enough parking space, double parking frequently occurs while blocking fronts of other vehicles.

In the case of double parking, the driver of the vehicle blocked on the front by the double-parked vehicle manually pushes and moves the double-parked vehicle to secure an exit space and then departs. To this end, the driver of the double-parked vehicle performs neutral parking by putting a transmission gear from a parking (P) position to a neutral (N) position.

There are some vehicles in which neutral parking is not performable.

In the case of vehicles equipped with an electronic transmission (a shift by wire: SBW) and an electronic parking brake (EPB), when the engine is turned off, the gear stage is automatically shifted to parking (P), and the EPB is automatically engaged. In the SBW, the shift of gear stages (P-R-N-D) is electronically performed.

Such vehicles, in which neutral parking is not performable, have no choice but to park in a state of the inability to park in neutral, and the driver of the vehicle blocked by the double parking may have inconvenience in calling the driver of the double parked vehicle to the parking lot.

SUMMARY

Therefore, it is an object of the disclosure to provide a provides an electronic parking brake system capable of realizing neutral parking based on shifting of the gear stage to neutral during parking to release engagement of an electronic parking brake, and a method of controlling the same.

The technical objectives of the disclosure are not limited to the above, and other objectives may become apparent to those of ordinary skill in the art based on the following descriptions.

According to an aspect of the disclosure, there is provided an electronic parking brake system including: an electronic parking brake provided in at least one of a front wheel and a rear wheel of a vehicle and driven by a motor; and a controller electrically connected to the motor, wherein the controller is configured to determine whether a gear stage of an electronic transmission system (a shift by wire: SBW) is shifted to a neutral position during ignition-off of the vehicle, and upon determining that the gear stage is shifted to the neutral position, release engagement of the electronic parking brake.

The controller may be configured to determine whether the gear stage is shifted to a neutral position during ignition-off of the vehicle, of which the gear stage automatically shifts to a parking position and the electronic parking brake is automatically engaged in response to switching to ignition-off.

The controller may be configured to switch from a sleep mode to a wake-up mode by an N-stage signal received from the electronic transmission system, and determine whether the gear stage is shifted to a neutral position during ignition-off of the vehicle in the wake-mode.

The controller may be connected to an N-stage switch of the electronic transmission system with a signal line, and receive the N-stage signal generated when the N-stage switch is turned on by a driver through the signal line.

The controller may be configured to, upon determining that the vehicle is in an ignition-off state and a gear stage signal received from the electronic transmission system is the N-stage signal in the wake-up mode, determine that the gear stage is shifted to the neutral position during ignition-off of the vehicle.

The controller may be configured to, upon determining that the vehicle is in an ignition-off state, a gear stage signal received from the electronic transmission system is the N-stage signal, and a brake pedal is in operation in the wake-up mode, determine that the gear stage is shifted to the neutral position during ignition-off of the vehicle.

The controller may be configured to, upon determining that the gear stage is shifted to the neutral position, determine whether the electronic parking brake is engaged, and upon determining that the electronic parking brake is engaged, release the engagement of the electronic parking brake.

The controller may be configured to, upon completion of the releasing of the engagement of the electronic parking brake, switch from a wake-up mode to a sleep mode.

According to another aspect of the disclosure, there is provided a method of controlling an electronic parking brake system including an electronic parking brake provided in at least one of a front wheel and a rear wheel of a vehicle and driven by a motor, the method including: determining whether a gear stage of an electronic transmission system (a shift by wire: SBW) is shifted to a neutral position during ignition-off of the vehicle; and upon determining that the gear stage is shifted to the neutral position, releasing engagement of the electronic parking brake.

The determining of whether the gear stage is shifted to the neural position may include determining whether the gear stage is shifted to a neutral position during ignition-off of the vehicle, of which the gear stage automatically shifts to a parking position and the electronic parking brake is automatically engaged in response to switching to an ignition-off state.

The determining of whether the gear stage is shifted to the neural position may include switching from a sleep mode to a wake-up mode by a N-stage signal received from the electronic transmission system, and determining whether the gear stage is shifted to a neutral position during ignition-off of the vehicle in the wake-mode.

The determining of whether the gear stage is shifted to the neural position may include receiving the N-stage signal that is generated when an N-stage switch of the electronic transmission system is turned on by a driver.

The determining of whether the gear stage is shifted to the neural position may include, upon determining that the vehicle is in an ignition-off state and a gear stage signal received from the electronic transmission system is the N-stage signal in the wake-up mode, determining that the gear stage is shifted to the neutral position during ignition-off of the vehicle.

The determining of whether the gear stage is shifted to the neural position may include, upon determining that the vehicle is in an ignition-off state, a gear stage signal received from the electronic transmission system is the N-stage signal, and a brake pedal is in operation in the wake-up mode, determining that the gear stage is shifted to the neutral position during ignition-off of the vehicle.

The releasing of the engagement of the electronic parking brake may include, upon determining that the gear stage is shifted to the neutral position, determining whether the electronic parking brake is engaged, and upon determining that the electronic parking brake is engaged, releasing the engagement of the electronic parking brake.

The releasing of the engagement of the electronic parking brake may include, upon completion of the releasing of the engagement of the electronic parking brake, switching from a wake-up mode to a sleep mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Figure 1:
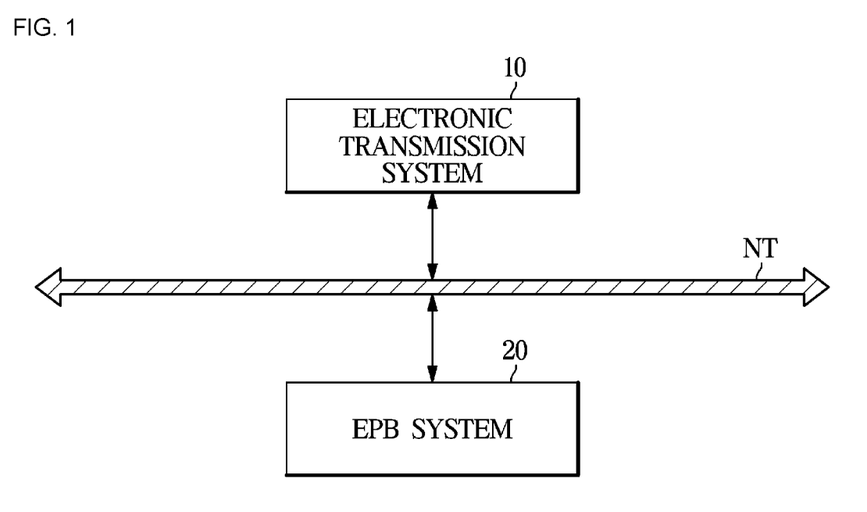
FIG. 1 is a diagram illustrating a vehicle to which an electronic parking brake system according to an embodiment is applied.

FIG. 1 is a diagram illustrating a vehicle to which an electronic parking brake system according to an embodiment is applied.

Referring to FIG. 1, a vehicle may include an electronic transmission system 10 and an electronic parking brake system 20.

The electronic transmission system 10 is a shifting system provided for convenience of shifting, in which when the driver presses an electronic shift button, or slightly pushes and pulls an electronic shift lever, an electrical signal is transmitted to a transmission such that a gear stage is shifted and the travel function is converted.

The electronic parking brake system 20 may communicate with the electronic transmission system 10 through a vehicle communication network NT. For example, the systems may transmit data through Ethernet, Media Oriented Systems Transport (MOST), Flexray, Controller Area Network (CAN), Local Interconnect Network (LIN), and the like.

Figure 2:
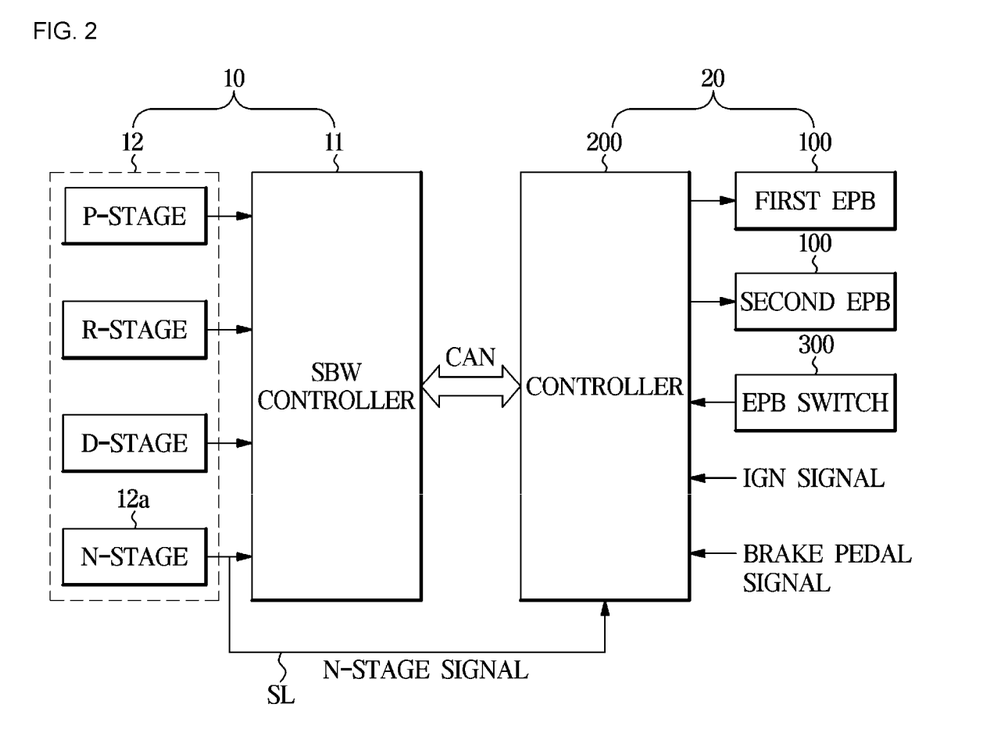
FIG. 2 is a control block diagram illustrating an electronic parking brake system according to an embodiment.

FIG. 2 is a control block diagram illustrating an electronic parking brake system according to an embodiment.

Referring to FIG. 2, the electronic parking brake system 20 may include two electronic parking brakes 100, a controller 200, and an EPB switch 300.

The first and second electronic parking brakes (the first EPB and the second EPB) 100 may be mounted on rear wheels of the vehicle. The EPB may be installed for each wheel.

The EPB switch 300 receives an intention to engage the EPB or an intention to release engagement of the EPB from the driver.

The controller 200 receives an EPB switch signal indicating the intention to engage the EPB or the intention to release the engagement of the EPB from the EPB switch 300.

The controller 200 controls the first and second EPBs 100 to engage or disengage the first and second EPBs 100.

The controller 200 is communicatively connected to a shift by wire (SBW) controller 11 that performs overall control of the electronic transmission system 10.

The SBW controller 11 receives a shift signal input from a shift manipulator 12 capable of electronically shifting between a P-stage (parking), an R-stage (reverse), an N-stage (neutral), and a D-stage (forward), and performs shift control according to the received shift signal. The shift manipulator 12 may be provided in various types, such as a button type, a lever type, or a mixture thereof. The SBW controller 11 may perform shift control by driving a solenoid or an electric motor according to a gear stage input of the shift manipulator 12 to apply or block hydraulic pressure for each gear stage.

The controller 200 may transmit and receive information to and from the SBW controller 11 through, for example, CAN communication.

The controller 200 may receive an ignition signal (an IGN signal) indicating an ignition state of the vehicle and a brake pedal signal indicating an operating state of a brake pedal. The controller 200 may receive the brake pedal signal from a brake pedal sensor that detects an operating state of the brake pedal, or may receive the brake pedal signal from another system through CAN communication.

As described above, in a vehicle equipped with an electronic transmission and an EPB, when ignition is turned off, the gear stage is automatically shifted to the P-stage, and the EPB is automatically engaged.

In this case, the controller 200 is switched to a sleep mode to save power. Accordingly, the controller 200 is neither able to wake up nor able to perform CAN communication with the SBW controller 11, so that the EPB cannot be disengaged and neutral parking is not performable.

In order to solve the constraints, the controller 200 may, when the gear stage of the electronic transmission system 10 is shifted to the N-stage by the driver during ignition-off, release the engagement of the EPB 100. With the shifting of the gear stage to the neutral position, the EPB 100 is allowed to be released from engagement, so that neutral parking is implemented.

The controller 200 is connected to an N-stage switch 12a of the electronic transmission system 10 by a signal line SL. The controller 200 may receive an N-stage signal generated when the N-stage switch 12a is turned on by the driver through the separate signal line SL even during the ignition-off of the vehicle. During ignition-off, power supply to all systems including the electronic transmission system 10 is cut off, and in response to the driver pressing the brake pedal, the electronic transmission system 10 may be supplied with operating power.

The controller 200 switches from a sleep mode to a wake-up mode by the N-stage signal, in response to receiving the N-stage signal of the electronic transmission system 10 during ignition-off. The sleep mode is a state in which, subsequent to the ignition of the vehicle being switched to an off stat, CAN communication is inoperable and a minimum current is consumed to prevent battery discharge, and operating power (wake-up power) is not be supplied to a processor that perform the overall control in the controller 200. The wakeup mode is a normal driving mode, which is a state after a wake-up signal is received in a sleep mode.

The controller 200, in response to switching to the wake-up mode, determines whether the vehicle is in an ignition-off state from an ignition signal (IGN signal) and the brake pedal is in operation from a brake pedal signal. The controller 200, if a result of the determination is that the vehicle is in an ignition-off state and the brake pedal is in operation, outputs a parking release command for releasing the engagement of the EPB 100 to the EPB 100.

Figure 3:
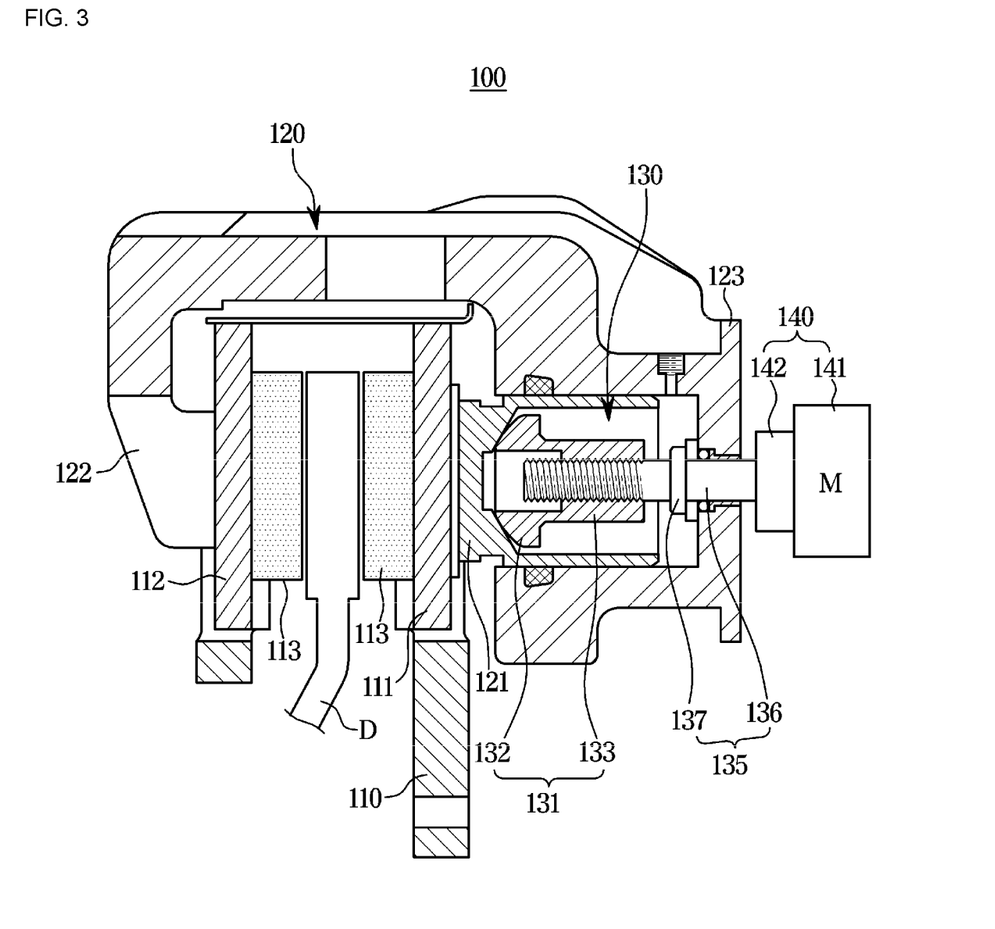
FIG. 3 is a block diagram illustrating a configuration of an electronic parking brake (EPB) applied to an electronic parking brake system according to an embodiment.

FIG. 3 is a block diagram illustrating a configuration of an electronic parking brake (EPB) applied to an electronic parking brake system according to an embodiment.

Referring to FIG. 3, the EPB 100 includes a carrier 110 in which a pair of pad plates 111 and 112 are reciprocatingly installed so as to press a brake disk D rotating together with the wheel of the vehicle, a caliper housing 120 slidably installed in the carrier 110 and provided with a cylinder 123 in which a piston 121 is installed so as to advance and retreat by braking hydraulic pressure, a power conversion unit 130 that presses the piston 121, and a motor actuator 140 for transmitting a rotational force to the power conversion unit 130 using a motor M.

The pair of pad plates 111 and 112 are divided into an inner pad plate 111 disposed to be in contact with the piston 121 and an outer pad plate 112 disposed to be in contact with a finger portion 122 of the caliper housing 120. The pair of pad plates 111 and 112 are installed on the carrier 110 fixed to the vehicle body so as to advance and retreat toward both sides of the brake disc D. In addition, each of the pad plates 111 and 112 has one surface facing the brake disk D to which a brake pad 113 is attached.

The caliper housing 120 is slidably installed on the carrier 110. More specifically, the caliper housing 120 is provided at a rear side with the power conversion unit 130, and includes the cylinder 123 in which the piston 121 is built-in to advance and retreat, and a finger portion 122 formed on a front side and bent in the downward direction to operate the outer pad plate 112. The finger portion 122 is integrally formed with the cylinder 123.

The piston 121 is provided in the form of a cylinder with a cup-shaped interior and is slidably inserted in the cylinder 123. The piston 121 presses the inner pad plate 111 toward the brake disk D by the axial force of the power conversion unit 130 receiving the rotational force of the motor actuator 140. Accordingly, in response to receiving the axial force of the power conversion unit 130, the piston 121 advances toward the inner pad plate 111 to press the inner pad plate 111, and the reaction force causes the caliper housing 120 to operate in the opposite direction to the piston 121 such that the finger portion 122 presses the outer pad plate 112 toward the brake disc D, thereby performing braking.

The power conversion unit 130 may serve to receive the rotational force from the motor actuator 140 to press the piston 121 toward the inner pad plate 111.

The power conversion unit 130 may include a nut member 131 that is disposed inside the piston 121 to be in contact with the piston 121, and a spindle member 135 screwed to the nut member 131.

The nut member 131 may be disposed inside the piston 121 in a state in which rotation is restricted, and screw-coupled to the spindle member 135.

The nut member 131 may include a head portion 132 provided to be in contact with the piston 121, and a coupling portion 133 extending from the head portion 132 and having a female thread on the inner circumferential surface thereof so as to be screwed with the spindle member 135.

The nut member 131 moves in a forward direction or a reverse direction according to the rotation direction of the spindle member 135 to press the piston 121 and release the pressure of the piston 121. In this case, the forward direction may be a direction in which the nut member 131 moves toward the piston 121. The backward direction may be a direction in which the nut member 131 moves away from the piston 121. In addition, the forward direction may be a direction in which the piston 121 moves toward the brake pad 113. The backward direction may be a direction in which the piston 121 moves away from the brake pad 113.

The spindle member 135 may include a shaft portion 136 passing through the rear portion of the caliper housing 120 and rotating based on receiving the rotational force of the motor actuator 140 and a flange portion 137 extending radially from the axial portion 136. The shaft portion 136 may have one side passing through the rear side of the cylinder 123 and rotatably installed, and the other side disposed inside the piston 121. In this case, the one side of the shaft portion 136 passing through the cylinder 123 is connected to an output shaft of a reducer 142 to receive the rotational force of the motor actuator 140.

The motor actuator 140 may include an electric motor 141 and a reducer 142.

The electric motor 141 may rotate the spindle member 135 to move the nut member 131 forward and backward to press the piston 121 or release the pressure of the piston 121.

The reducer 142 may be provided between the output side of the electric motor 141 and the spindle member 135.

With such a configuration, the EPB, in a parking apply mode, may rotate the spindle member 135 in one direction using the motor actuator 140 to move the nut member 131 to thereby press the piston 121. The piston 121 pressed by the movement of the nut member 131 presses the inner pad plate 111 to bring the brake pad 113 into close contact with the brake disc D, thereby generating a clamping force.

In addition, the EPB, in a parking release mode, may rotate the spindle member 135 in the opposite direction using the motor actuator 140 to cause the nut member 1131 pressed by the piston 121 to move backward. The backward movement of the nut member 131 causes the pressure on the piston 121 to be released. By the pressure on the piston 121 being released, the brake pad 113 moves away from the brake disc D such that the generated clamping force is released.

Figure 4:
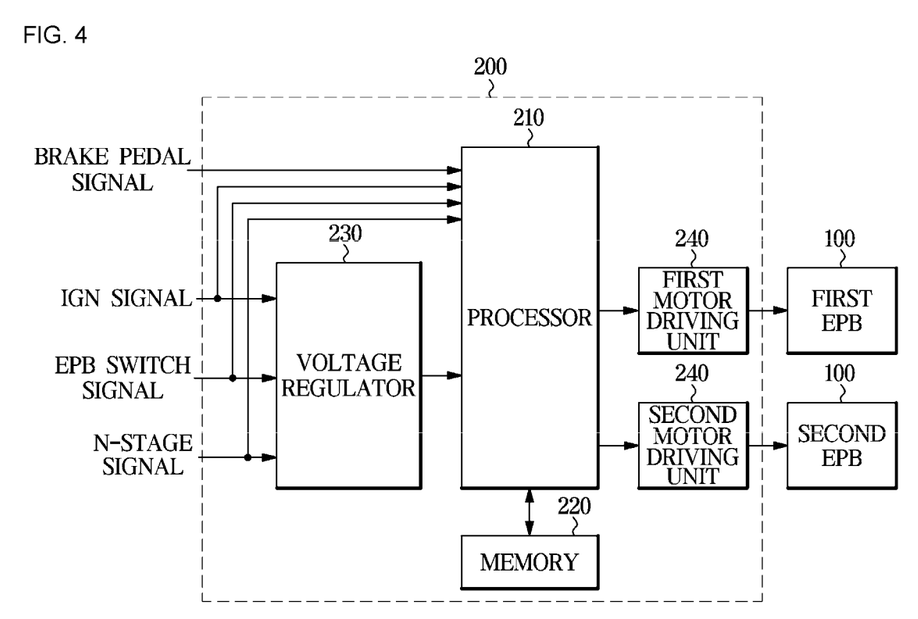
FIG. 4 is a diagram illustrating a detailed configuration of a controller of an electronic parking brake system according to the embodiment.

FIG. 4 is a diagram illustrating a detailed configuration of a controller of an electronic parking brake system according to the embodiment.

Referring to FIG. 4, the controller 200 may be referred to as an electronic control unit (ECU).

The controller 200 may include a processor 210, a memory 220, a voltage regulator 230, and first and second motor driving units 240.

The processor 210 may control the overall operation of the EPB system.

The memory 220 may store a program required for the processor 210 to perform processing or controlling and various types of data for operation of the EPB system.

The memory 220 may include not only volatile memories, such as an S-RAM and a D-RAM, but also of non-volatile memories, such as flash memories, read-only memories (ROM), erasable programmable read only memories (EPROMs), and the like.

The voltage regulator 230 may receive an ignition signal (an IGN signal), an EPB switch signal, and an N-stage signal.

The voltage regulator 230, in response to one of the ignition signal (the IGN signal), the EPB switch signal, and the N-stage signal being received, supplies the processor 210 with wake-up power, which is operating power, to wake up the processor 210.

The processor 210, in response to the wake-up power being applied from the voltage regulator 230, switches from a sleep mode to a wake-up mode.

The processor 210 together with the voltage regulator 230 may receive an ignition signal (an IGN signal), an EPB switch signal, and an N-stage signal. The processor 210 may determine whether the vehicle is in an ignition-on state or an ignition-off state according to the ignition signal (the IGN signal). The processor 210 may determine whether the driver intends to engage or release engagement of the EPB 100 according to the EPB switch signal. The processor 210 may determine whether the driver has manipulated the gear stage of the electronic transmission system 10 to the N-stage based on the N-stage signal.

The processor 210 may receive a brake pedal signal.

The first and second motor driving units 240 drive the electric motors 141 of the first and second EPBs 100 under the control of the processor 210 to perform an engagement operation for generating a clamping force in the first and second EPBs 100 or perform a disengagement operation for releasing the generated clamping force.

Figure 5:
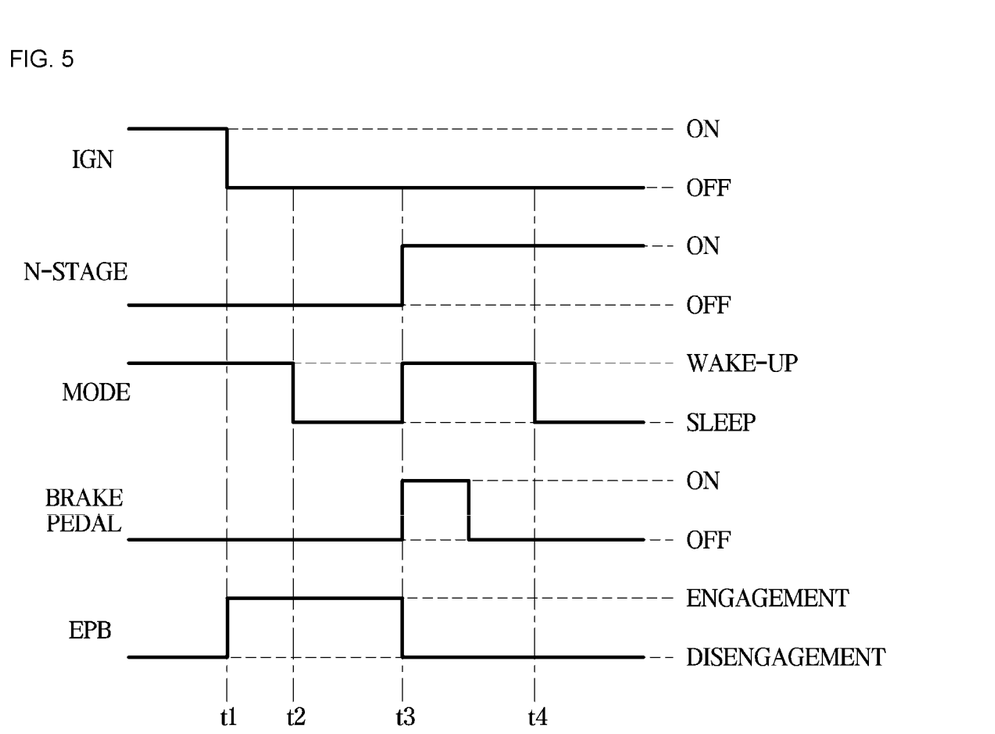
FIG. 5 is a diagram illustrating a control timing of an electronic parking brake system according to the embodiment.

FIG. 5 is a diagram illustrating a control timing of an electronic parking brake system according to the embodiment.

Referring to FIG. 5, when the ignition of the vehicle is switched from an on-state to an off-state at a time t1, the EPB 100 starts to be engaged at the time t1 and the engagement is completed at a time t2.

In this state, if the driver manipulates the N-stage among the shift buttons of the electronic transmission system 10 for neutral parking during the ignition-off state, in which the ING signal indicate an off-state, the N-stage signal is set into an on-state, and the N-stage signal allows the processor 210 to be supplied with operating power from the voltage regulator 230, so that the sleep mode is switched to the wake-up mode.

The processor 210 releases the engaged EPB 100 if the N-stage signal is in an on-state, the ignition is in an off-state, and the brake pedal is operation at a t3 when which the processor 210 is switched to a wake-up state.

The processor 210, at a time t4 when the release of the engagement of the EPB 100 is completed, is switched from the wakeup mode back to the sleep mode.

Figure 6:
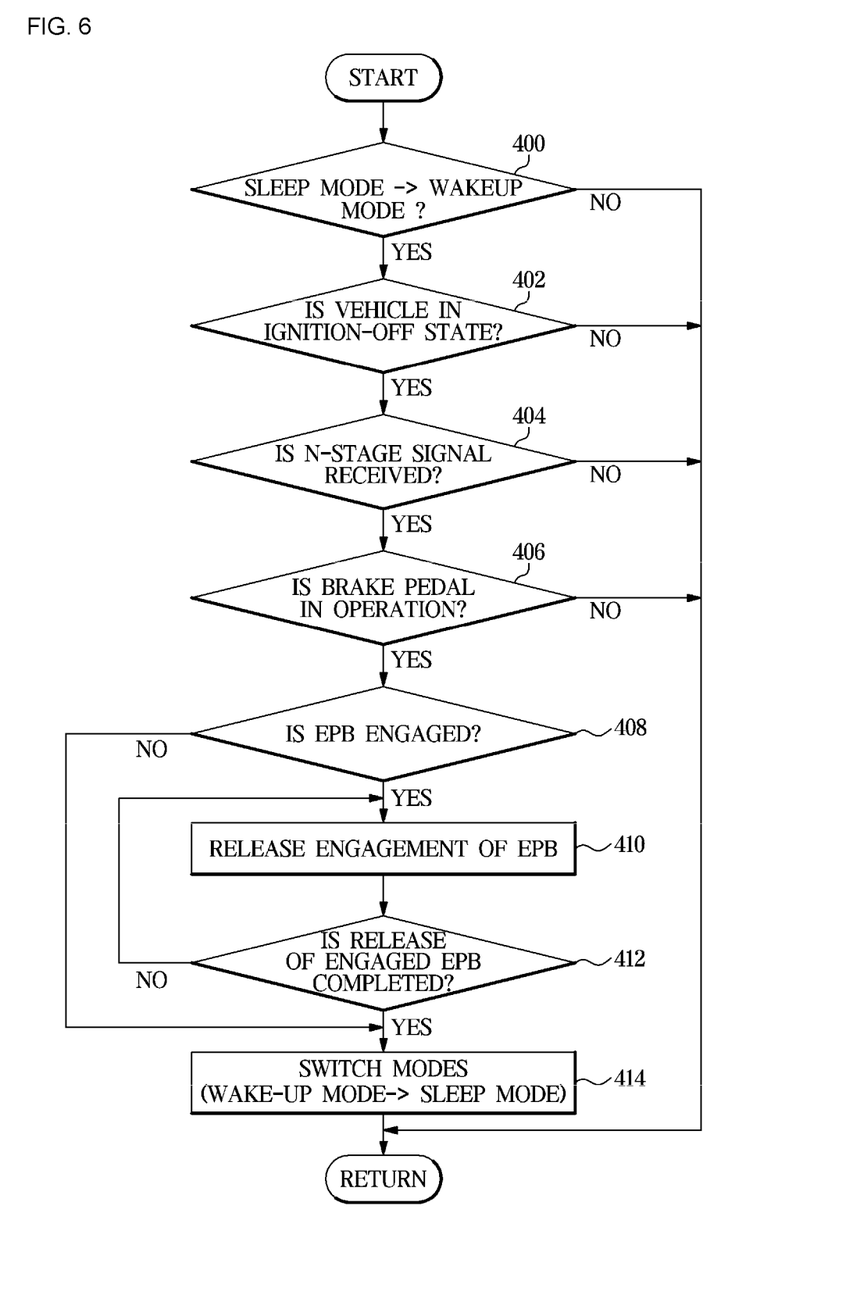
FIG. 6 is a flow chart showing a method of controlling an electronic parking brake system according to an embodiment.

FIG. 6 is a flow chart showing a method of controlling an electronic parking brake system according to an embodiment.

Referring to FIG. 6, the method of controlling the EPB system according to the embodiment may include determining whether the operation mode is switched from a sleep mode to a wake-up mode (400), determining whether the vehicle is in an ignition-off state (402), determining whether an N-stage signal is received (404), determining whether the brake pedal is in operation (406), determining whether the EPB is engaged (408), releasing engagement of the EPB (410), determining whether the release of the engagement of the EPB is completed (412), and switching from a wakeup mode to a sleep mode (414).

The processor 210 determines whether the operation mode is switched from a sleep mode to a wake-up mode. The processor 210 is switched from a sleep mode to a wake-up mode based on receiving wake-up power from the voltage regulator 230. The voltage regulator 230 supplies wake-up power to the processor 210 in response to receiving an ignition signal (an IGN signal), an EPB switch signal, or an N-stage signal of the electronic transmission system 10.

The processor 210, in response to switch from the sleep mode to the wake-up mode, determines whether the N-stage signal of the electronic transmission system 10 is received. This is to determine whether the switch from the sleep mode to the wakeup mode is caused by the N-stage signal.

The processor 210, upon determining whether the N-stage signal is received, determines whether the brake pedal is in operation from the brake pedal signal.

The processor 210 determines whether the EPB 100 is engaged.

The processor 210, upon determining that the EPB 100 is engaged, releases the engagement of the EPB 100 through the first and second motor driving units 240.

The processor 210 determines whether the release of the engagement of the EPB 100 is completed. The processor 210 may determine whether the release of the engagement of the EPB 100 is completed using a position sensor of the electric motor 141 in the EPB 100.

The processor 210 may, in response to the release of the engagement of the EPB 100 being completed, switch from the wake-up mode back to the sleep mode.

As described above, the EPB system according to the embodiment may release the engagement of the EPB based on shifting of Othe gear stage to a neutral position during parking, thereby implementing neutral parking.

Meanwhile, the above described controller and/or components thereof may include one or more processors/microprocessors combined with a computer-readable recording medium that stores computer-readable code/algorithm/software. The processor (s)/microprocessor(s) may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable transitory recording medium. The memory may be controlled by the above described controller and/or components thereof, and may be configured to store data transmitted to or received from the above described controller and/or components, or store data processed or to be processed by the above described controller and/or components thereof.

The disclosed embodiment can be implemented as a computer-readable code/algorithm/software in a computer readable medium. The computer-readable medium may include a non-transitory computer readable recording medium, such as a data storage device that store data that can be read by a processor/microprocessor. Examples of computer-readable recording media include a Hard Disk Drive (HDD), a Solid State Disk (SSD), a Silicon Disk Drive (SDD), a read-only memory (ROM), a random access memory (RAM), a compact disc read only memory (CD-ROM), a magnetic tape, a floppy disk, an optical data storage device, etc.

As is apparent from the above, the electronic parking brake system according to the present disclosure and the method of controlling the same can realize neutral parking based on shifting of the gear stage to neutral during parking to release engagement of an electronic parking brake.

What is claimed is:

1. An electronic parking brake system of a vehicle driven by a motor, the electronic parking brake system comprising:
   an electronic parking brake provided in at least one of a front wheel or and a rear wheel of the vehicle; and
   a controller electrically connected to the motor and to an electronic transmission system,
   wherein the controller is configured to:
   based on determining that an ignition of the vehicle is turned off, control the motor to engage the electronic parking brake in a wake-up mode and switch from the wake-up mode to a sleep mode, and
   based on receiving a signal indicating that a gear stage of the electronic transmission system is shifted to a neutral position in the sleep mode after determining that the ignition of the vehicle is turned off, switch from the sleep mode to the wake-up mode and control the motor to release the engagement of the electronic parking brake in the wake-up mode.

2. The electronic parking brake system of claim 1, wherein the controller is configured to determine that the gear stage is in the neutral position after determining that the ignition of the vehicle is turned off based on the receiving the signal from the electronic transmission system after determining that the ignition of the vehicle is turned off.

3. The electronic parking brake system of claim 2, wherein the controller is connected to an N-stage switch of the electronic transmission system with a signal line, and is configured to receive the signal when the N-stage switch is turned on by a driver through the signal line.

4. The electronic parking brake system of claim 2, wherein the controller is configured to determine that the gear stage is in the neutral position after determining that the ignition of the vehicle is turned off based on determining that (a) the vehicle is in an ignition-off state and (b) the signal is received from the electronic transmission system.

5. The electronic parking brake system of claim 2, wherein the controller is configured to determine that the gear stage is in the neutral position after determining that the ignition of the vehicle is turned off based on, upon-determining that (a) the vehicle is in an ignition-off state, (b) the signal is received from the electronic transmission system, and (c) a brake pedal is in operation.

6. The electronic parking brake system of claim 1, wherein the controller is configured to, upon determining that the gear stage is in the neutral position after determining that the ignition of the vehicle is turned off, determine whether the electronic parking brake is engaged, and upon determining that the electronic parking brake is engaged, release the engagement of the electronic parking brake.

7. The electronic parking brake system of claim 6, wherein the controller is configured to, upon completion of the releasing of the engagement of the electronic parking brake, switch from the wake-up mode to the sleep mode.

8. A method of controlling an electronic parking brake system of a vehicle driven by a motor, the electronic parking brake system including an electronic parking brake provided in at least one of a front wheel and a rear wheel of the vehicle, the method comprising:
   based on determining that an ignition of the vehicle is turned off, controlling the motor to engage the electronic parking brake in a wake-up mode and switching from the wake-up mode to a sleep mode; and
   based on receiving a signal indicating that a gear stage of an electronic transmission system is shifted to a neutral position in the sleep mode after determining that the ignition of the vehicle is turned off, switching from the sleep mode to the wake-up mode and controlling the motor to release the engagement of the electronic parking brake.

9. The method of claim 8, further comprising determine that the gear stage is in the neutral position after determining that the ignition of the vehicle is turned off based on the receiving the signal from the electronic transmission system after determining that the ignition of the vehicle is turned off.

10. The method of claim 9, wherein the receiving of the signal from the electronic transmission system includes:
    receiving the signal when an N-stage switch of the electronic transmission system is turned on by a driver.

11. The method of claim 9, wherein the determining of that the gear stage is in the neutral position includes:
    determining that the gear stage is in the neutral position after determining that the ignition of the vehicle is turned off based on determining that the vehicle is in an ignition-off state and the signal is received from the electronic transmission system.

12. The method of claim 9, wherein the determining of that the gear stage is in the neutral position includes:
   determining that the gear stage is in the neutral position after determining that the ignition of the vehicle is turned off based on determining that the vehicle is in an ignition-off state, the signal is received from the electronic transmission system, and a brake pedal is in operation.

13. The method of claim 8, wherein the releasing of the engagement of the electronic parking brake includes:
   upon determining that the gear stage is in the neutral position after determining that the ignition of the vehicle is turned off, determining whether the electronic parking brake is engaged, and upon determining that the electronic parking brake is engaged, releasing the engagement of the electronic parking brake.

14. The method of claim 13, wherein the releasing of the engagement of the electronic parking brake includes:
   upon completion of the releasing of the engagement of the electronic parking brake, switching from the wake-up mode to the sleep mode.

* * * * *